(12) United States Patent
McMahon et al.

(10) Patent No.: US 8,405,725 B2
(45) Date of Patent: *Mar. 26, 2013

(54) VEHICULAR VIDEO PROCESSOR MODULE

(75) Inventors: Martha A. McMahon, Ann Arbor, MI (US); Troy O. Cooprider, Rochester, MI (US)

(73) Assignee: Donnelly Corporation, Holland, MI (US)

( * ) Notice: Subject to any disclaimer, the term of this patent is extended or adjusted under 35 U.S.C. 154(b) by 593 days.

This patent is subject to a terminal disclaimer.

(21) Appl. No.: 12/708,079

(22) Filed: Feb. 18, 2010

(65) Prior Publication Data

US 2010/0188508 A1 Jul. 29, 2010

Related U.S. Application Data

(63) Continuation of application No. 10/209,181, filed on Jul. 31, 2002, now Pat. No. 7,697,027.

(60) Provisional application No. 60/309,023, filed on Jul. 31, 2001.

(51) Int. Cl.
*H04N 7/00* (2006.01)
*H04N 7/18* (2006.01)
*G09B 9/00* (2006.01)

(52) U.S. Cl. ........ 348/148; 348/113; 348/118; 348/121; 348/122; 348/143

(58) Field of Classification Search .................... 348/148
See application file for complete search history.

(56) References Cited

U.S. PATENT DOCUMENTS

| | | | |
|---|---|---|---|
| 3,947,095 A | 3/1976 | Moultrie | 350/302 |
| 4,214,266 A | 7/1980 | Myers | 358/108 |
| 4,277,804 A | 7/1981 | Robison | 358/108 |
| 4,626,850 A | 12/1986 | Chey | 340/903 |
| 4,892,345 A | 1/1990 | Rachael, III | 296/24.1 |
| 4,937,796 A | 6/1990 | Tendler | 367/116 |
| 5,121,200 A | 6/1992 | Choi | 358/103 |
| 5,406,395 A | 4/1995 | Wilson et al. | 359/15 |
| 5,414,461 A | 5/1995 | Kishi et al. | 348/115 |
| 5,535,314 A | 7/1996 | Alves et al. | 395/131 |
| 5,550,677 A | 8/1996 | Schofield et al. | 359/604 |
| 5,574,443 A | 11/1996 | Hsieh | 340/901 |
| 5,648,835 A | 7/1997 | Uzawa | 396/429 |
| 5,668,663 A | 9/1997 | Varaprasad et al. | 359/608 |
| 5,670,935 A | 9/1997 | Schofield et al. | 340/461 |
| 5,680,123 A | 10/1997 | Lee | 340/937 |
| 5,680,313 A * | 10/1997 | Whittaker et al. | 701/300 |

(Continued)

FOREIGN PATENT DOCUMENTS

| | | |
|---|---|---|
| DE | 2931368 A1 | 8/1979 |
| DE | 3248511 A1 | 7/1984 |

(Continued)

OTHER PUBLICATIONS

Ericsson Press Release—Jun. 5, 2000.

*Primary Examiner* — Justin Shepard
(74) *Attorney, Agent, or Firm* — Gardner, Linn, Burkhart & Flory, LLP (57) ABSTRACT

A video processor module suitable for use in a vehicle includes a video processor and a plurality of imaging sensor interfaces having at least a first imaging sensor interface configured for communication with a first imaging sensor of the equipped vehicle and a second imaging sensor interface configured for communication with a second imaging sensor of the equipped vehicle, with the first and second imaging sensor interfaces receiving image data captured by the first and second imaging sensors of the equipped vehicle, respectively. The video processor may include an object detection section, a camera selection section, a camera control section and/or a memory section. The video processor module may include a vehicle interface section.

41 Claims, 2 Drawing Sheets

U.S. PATENT DOCUMENTS

| | | | | |
|---|---|---|---|---|
| 5,724,187 | A | 3/1998 | Varaprasad et al. | 359/608 |
| 5,760,828 | A | 6/1998 | Cortes | 348/143 |
| 5,786,772 | A | 7/1998 | Schofield et al. | 340/903 |
| 5,796,094 | A | 8/1998 | Schofield et al. | 250/208.1 |
| 5,798,575 | A | 8/1998 | O'Farrell et al. | 307/10.1 |
| 5,912,980 | A * | 6/1999 | Hunke | 382/103 |
| 5,914,815 | A | 6/1999 | Bos | 359/571 |
| 5,929,786 | A | 7/1999 | Schofield et al. | 340/903 |
| 5,949,331 | A | 9/1999 | Schofield et al. | 340/431 |
| 5,959,367 | A | 9/1999 | O'Farrell et al. | 307/10.1 |
| 5,982,544 | A | 11/1999 | Ogata | 359/565 |
| 6,097,023 | A | 8/2000 | Schofield et al. | 250/11 |
| 6,115,651 | A | 9/2000 | Cruz | 701/1 |
| 6,151,539 | A * | 11/2000 | Bergholz et al. | 701/25 |
| 6,161,066 | A * | 12/2000 | Wright et al. | 701/36 |
| 6,175,164 | B1 | 1/2001 | O'Farrell et al. | 307/10.1 |
| 6,175,300 | B1 | 1/2001 | Kendrick | 340/436 |
| 6,198,409 | B1 | 3/2001 | Schofield et al. | 340/903 |
| 6,201,642 | B1 | 3/2001 | Bos | 359/565 |
| 6,222,447 | B1 | 4/2001 | Schofield et al. | 340/461 |
| 6,313,454 | B1 | 11/2001 | Bos et al. | 250/208.1 |
| 6,320,176 | B1 | 11/2001 | Schofield et al. | 250/208.1 |
| 6,353,392 | B1 | 3/2002 | Schofield et al. | 340/602 |
| 6,396,397 | B1 | 5/2002 | Bos et al. | 340/461 |
| 6,396,408 | B2 | 5/2002 | Drummond et al. | |
| 6,414,712 | B1 | 7/2002 | Wanielik et al. | |
| 6,590,719 | B2 | 7/2003 | Bos | 359/753 |
| 6,593,960 | B1 | 7/2003 | Sugimoto et al. | |
| 6,690,268 | B2 | 2/2004 | Schofield et al. | 340/438 |
| 6,801,638 | B1 | 10/2004 | Janssen et al. | |
| 6,917,693 | B1 * | 7/2005 | Kiridena et al. | 382/104 |
| 7,035,433 | B1 * | 4/2006 | Mihara et al. | 382/107 |
| 7,190,882 | B2 * | 3/2007 | Gammenthaler | 386/211 |
| 7,755,668 | B1 * | 7/2010 | Johnston et al. | 348/211.4 |
| 2002/0003571 | A1 * | 1/2002 | Schofield et al. | 348/148 |
| 2002/0047901 | A1 * | 4/2002 | Nobori et al. | 348/149 |
| 2002/0048086 | A1 | 4/2002 | Bos | 359/566 |
| 2002/0156559 | A1 * | 10/2002 | Stam et al. | 701/36 |
| 2002/0159270 | A1 | 10/2002 | Lynam et al. | 362/492 |

FOREIGN PATENT DOCUMENTS

| | | |
|---|---|---|
| EP | 0416222 A2 | 3/1991 |
| EP | 0513476 A1 | 11/1992 |
| FR | 2241085 | 3/1975 |
| FR | 2585991 | 2/1987 |
| FR | 2673499 | 9/1992 |
| GB | 934037 | 8/1963 |
| GB | 2137573 A | 10/1984 |
| GB | 2244187 A | 11/1991 |
| GB | 2327823 A | 2/1999 |
| JP | 5539843 | 3/1980 |
| JP | 58209635 | 12/1983 |
| JP | 62122487 | 6/1987 |
| JP | 62122844 | 6/1987 |
| JP | 361192 | 3/1991 |
| JP | 3151829 | 1/1993 |
| JP | 10076881 A | 9/1996 |
| WO | 09638319 | 12/1996 |

\* cited by examiner

VEHICULAR VIDEO PROCESSOR MODULE

CROSS-REFERENCE TO RELATED APPLICATIONS

This application is a continuation of U.S. patent application Ser. No. 10/209,181, filed Jul. 31, 2002, now U.S. Pat. No. 7,697,027 which claims priority from United States provisional patent application Ser. No. 60/309,023, filed on Jul. 31, 2001, the disclosure of which is hereby incorporated herein by reference in its entirety.

FIELD OF THE INVENTION

This invention is directed to a video processor made for a vehicular video system and, more particularly, to a single electronic module which processes images from multiple image capture devices, such as CMOS video cameras, mounted throughout the interior and/or exterior of a vehicle, such as an automobile.

BACKGROUND THE INVENTION

It is known to use multiple video cameras on a vehicle to capture images both interior to the vehicle and exterior to the vehicle. It is also known to process the image outputs of such cameras by a variety of controls in order to display said images to a driver or another occupant of the vehicle, or to utilize the output of a camera in order to generate a control signal for a vehicular accessory, such as a headlamp or windshield wiper. As the number and complexity of camera-based accessories and features grows in a vehicle, there is a need to economically and efficiently process the multiple outputs from a plurality of camera and other sensors in order to perform a plurality of image displays and control functions.

SUMMARY OF THE INVENTION

The present invention is directed to a Video Processor Module (VPM) that is adapted to accept input from several vehicular cameras and optionally from other non-video devices and sensors in or on the vehicle and to process the image outputs therefrom in order to provide a variety of functions and controls. The VPM is preferably further adapted to interface with other vehicle modules via interfaces to the vehicle communication buses, such as via a CAN bus and/or a LIN bus.

A vehicle-based video processor module for a video system of a vehicle, according to an aspect of the invention, includes a video processor circuit, a plurality of electronic sensor interfaces that are operable to receive image output data from a plurality of imaging devices and at least one electronic vehicle interface that is operable to communicate with a vehicle communication bus. The video processor circuit is operable to process the image output data from the plurality of imaging devices into a single database in a standard format.

A vehicle-based video processor module for a video system of a vehicle, according to an aspect of the invention, includes a video processor circuit, a plurality of electronic sensor interfaces that are operable to receive image output data from a plurality of imaging devices and at least one electronic vehicle interface that is operable to communicate with a vehicle communication bus. The video processor circuit is operable to process the image output data from the plurality of imaging devices and to enhance the image output data.

These and other objects, advantages and features of this invention will become apparent upon review of the following specification in conjunction with the drawings.

DESCRIPTION OF THE PREFERRED EMBODIMENT

Figure 1:
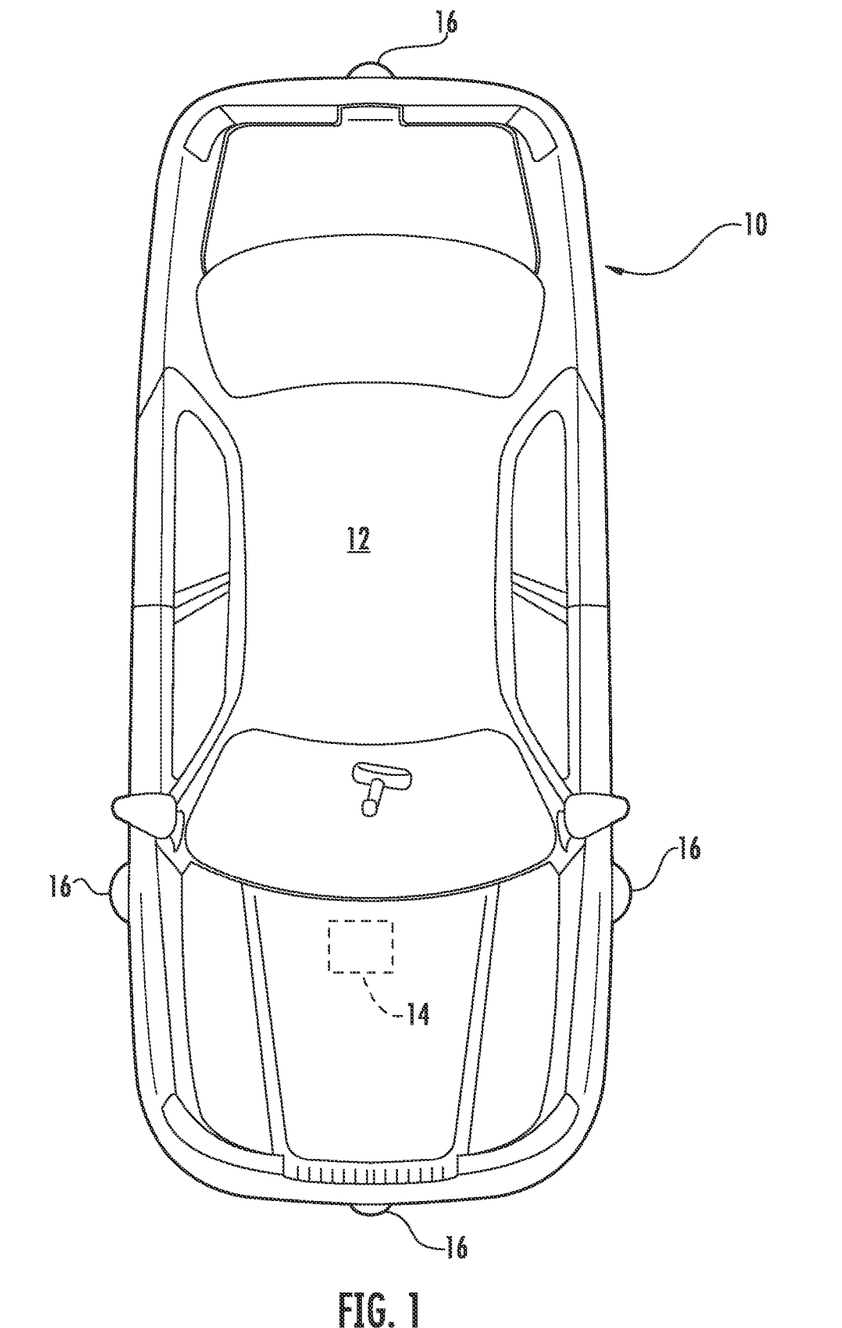
FIG. 1 is a top plan view of a vehicle outfitted with a vehicular video system, according to the invention.

Referring now to the drawings and the illustrative embodiments depicted therein, a vehicle 10 is illustrated in FIG. 1 having a vehicular video system 12, according to the invention. Vehicular video system 12 includes video processor module (VPM) 14, which receives input from a plurality of sensors, generally shown at 16. VPM 14 processes the output data from the plurality of devices and enhances the image output data. Sensors 16 may be imaging devices, such as vehicular cameras, as well as non-imaging devices. An example of a mix of sensors 16 that may be used in vehicular video system 12 includes imaging sensors, forward-facing imaging sensors, rearward-facing imaging sensors, left-side-facing imaging sensors, right-side-imaging sensors, inward-facing cabin-imaging sensors, and the like. Non-video sensors may include a near infrared sensor, a far infrared sensor, a radar sensor such as a Doppler radar sensor, a sonar sensor, a thermal sensor, a night vision sensor such as a multi-pixel bolometer and any other sensors which establish the presence, distance to, position and/or speed of an object. A Doppler radar sensor or side-facing camera may be mounted at an exterior mirror assembly. A forward-facing camera may be mounted at an interior mirror assembly of the vehicle that performs a headlamp control and/or windshield wiper control function. A side lane blind spot and/or lane change system may be provided and the VPM may be adapted to accept data from a variety of other non-video sensors to enhance performance in all visibility situations, such as when driving in fog or other low visibility conditions.

Video processor module 14 includes a video processor circuit 18 and a plurality of electronic sensor interfaces 20 for receiving data from a plurality of sensors 16. In the embodiment illustrated in FIG. 2, electronic interfaces 20 are illustrated as receiving image data output respectively from right-hand-facing and left-hand-facing side cameras, a front-facing camera and a rear-facing camera. The image data may be transmitted across a robust transmission means, such as a fiber-optic cable or a high-density wireless link, or the like. However, electronic interfaces 20 are capable of receiving data from non-imaging sensors as well. Electronic interfaces 20 may be utilized, J1394 Firewire protocol, NTSC protocol, or other standard protocol. Video processor module 14 includes at least one electronic vehicle interface 22 which is operative to interface with a vehicle bus, such as a CAN bus, a LIN bus, or the like.

Figure 2:
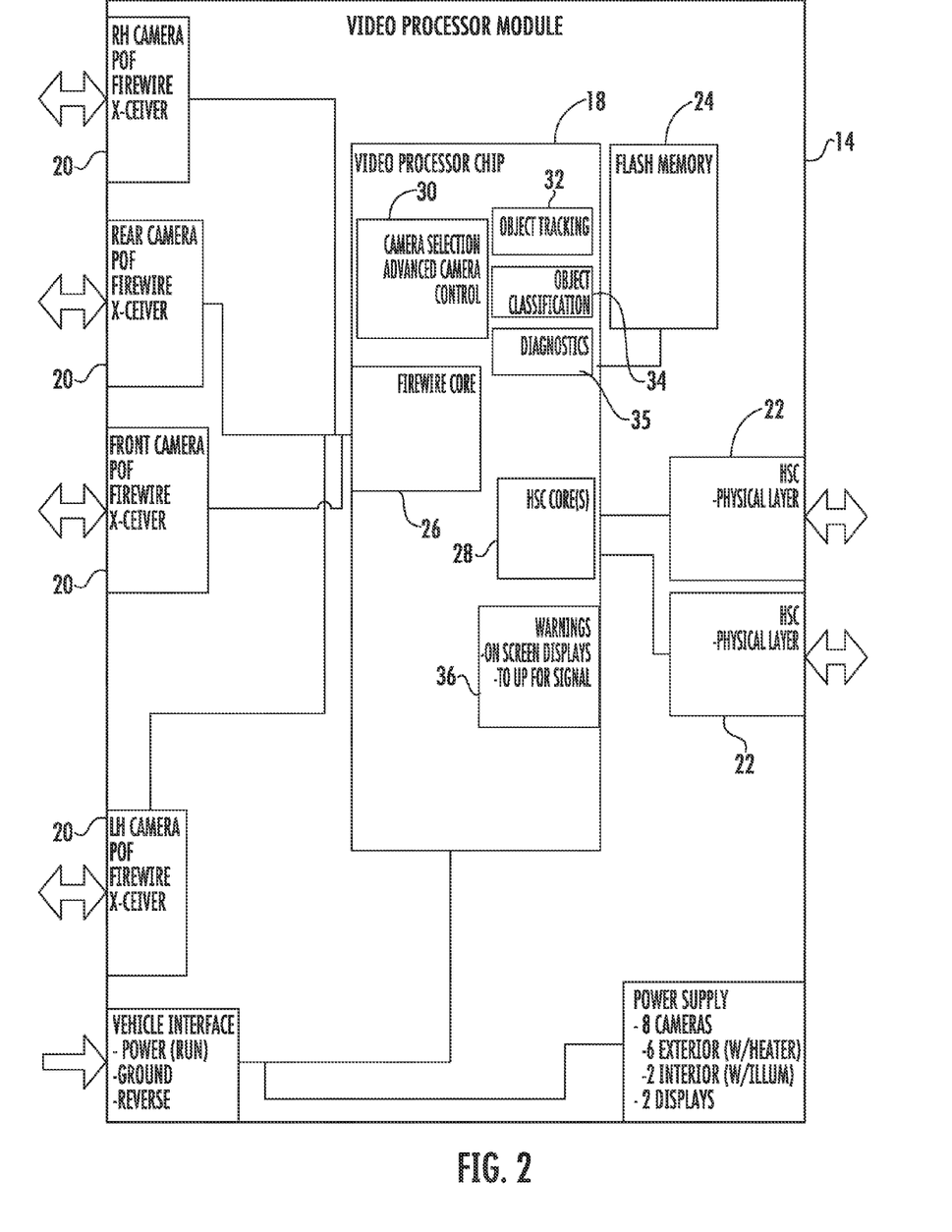
FIG. 2 is a block diagram of a video processor module, according to the invention.

Video processor circuit 18 includes a core 26 to exchange data with electronic sensor interfaces 20, and a core 28 to exchange data with electronic vehicle interfaces 22. A memory device 24 stores various data such as settings. Video processor circuit 18 includes a camera selection and advanced camera control section 30 for controlling the individual sensor devices and for integrating data from the plurality of sensors, such as by fusing or combining image data from multiple imaging sensors and data from non-imaging sensors.

This combined or fused data is preprocessed into a single database in a standard format. Video processor circuit 18 further includes an object-tracking section 32 for tracking objects that are identified and classified by an object classification section 34. Video processor circuit 18 further includes a display section 36 which generates on-screen display signals and a diagnostic section 35 for performing diagnostics.

Having described the components of vehicular video system 12 and their operation, examples of various functions that can be supported with this vehicular video system will be set forth. One set of functions includes features for viewing of a displayed image. Video processor module 14 may be capable of merging of images from a plurality of imaging sensors 16 to provide a panoramic view, which exceeds the field of view of a single camera or allows the image to "wrap" around the vehicle. Video processor module 14 may be further capable of electronic elimination of distortions created by wide-angle lenses used with sensors 16. Video processor module 14 may be capable of superimposing graphics onto a displayed image to provide additional information to the observer.

Another set of functions includes features for sensing using an electronic image. Video processor module 14 may be programmed to be capable of detection with object position, speed and classification to support one or more of the following features:

Blind spot detection
Lane change aid
Adaptive speed control
Reverse aid warning
Advanced crash warning Video processor module 14 may be programmed to be capable of detecting the location of a lane on a road in conjunction with an imaging sensor 16. This capability can support a lane departure-warning feature or autonomous vehicle control. Video processor module 14 may use imaging sensors to establish ambient lighting and detect other vehicles for automatic control of the headlamps (on/off) and high/low beams. Video processor module 14 may have the capability to use imaging sensors to establish ambient lighting and vehicle headlamps for automatic control of electrochromic mirrors. Video processor module 14 may have the capability to detect the presence, position and size of occupants inside the vehicle. Video processor module 14 may have the capability to stabilize an image for viewing or use in sensing algorithms. It should be understood that the listed features and functions are illustrative only. Which of the particular ones that are used for a particular vehicular application may differ from those used for other vehicular applications. Additionally, other features and functions may be identified for video processor module 14 by the skilled artisan.

VPM 14 can be utilized in a variety of applications such as disclosed in commonly assigned U.S. Pat. Nos. 5,670,935; 5,949,331; 6,222,447; 6,201,642; 6,097,023; 5,715,093; 5,796,094; and 5,877,897 and commonly assigned patent applications, Ser. No. 09/793,002 filed Feb. 26, 2001, by Schofield et al. for a VIDEO MIRROR SYSTEM INCORPORATING AN ACCESSORY MODULE, now U.S. Pat. No. 6,690,268, Ser. No. 09/372,915, filed Aug. 12, 1999, by Bos for a VEHICLE VISION SYSTEM WITH STEREO IMAGING, now U.S. Pat. No. 6,396,397, Ser. No. 09/767,939, filed Jan. 23, 2001, by Bos for a WIDE ANGLE IMAGING SYSTEM, now U.S. Pat. No. 6,590,719, Ser. No. 09/776,625, filed Feb. 5, 2001, by Schofield et al. for a VEHICLE CAMERA DISPLAY SYSTEM, now U.S. Pat. No. 6,611,202, Ser. No. 09/799,993, filed Mar. 6, 2001, by Bos for a NON-CIRCULAR APERTURE STOP, now U.S. Pat. No. 6,538,827, Ser. No. 09/493,522, filed Jan. 28, 2000, by Bos for an ELECTROCHROMIC APERTURE, now U.S. Pat. No. 6,426,492, Ser. No. 09/199,907, filed Nov. 25, 1998, by Bos for a WIDE ANGLE IMAGE CAPTURE SYSTEM FOR VEHICLE, now U.S. Pat. No. 6,717,610, Ser. No. 08/952,026, filed Nov. 19, 1997, by Schofield et al. for a REARVIEW VISION SYSTEM FOR VEHICLE INCLUDING PANORAMIC VIEW, now U.S. Pat. No. 6,498,620, and Ser. No. 09/227,344, filed Jan. 8, 1999, by Schofield et al. for a VEHICLE CONTROL SYSTEM AND METHOD, now U.S. Pat. No. 6,302,545, International Publication No. WO 96/38319, published Dec. 5, 1996, for a REARVIEW VISION SYSTEM FOR A VEHICLE INCLUDING PANORAMIC VIEW, and International Publication No. WO 99/23828, published May 14, 1999, for a RAIN SENSOR WITH FOG DISCRIMINATION, the disclosures of which are collectively incorporated herein by reference.

For example, VPM 14 can be utilized in a vehicle equipped with a side object detection system utilizing stereoscopic imaging from cameras located in the driver-side exterior mirror assembly and/or in the passenger-side exterior mirror assembly, such as is described in commonly assigned patent application Ser. No. 09/372,915, filed Aug. 12, 1999, by Bos et al. for a VEHICLE IMAGING SYSTEM WITH STEREO IMAGING, now U.S. Pat. No. 6,396,397, the disclosure of which is hereby incorporated herein by reference, and further equipped with a CMOS camera-based headlamp controller as disclosed in commonly assigned U.S. Pat. Nos. 5,796,094 and 6,097,023, the disclosures of which are hereby incorporated herein by reference, and with the various image outputs being processed by the VPM. In this regard, should the vehicle be equipped with high intensity discharge (HID)/gas discharge headlamps (as known in the automotive lighting art), then the VPM can receive the output signal from a forward-facing CMOS camera (preferably mounted at or in the interior rearview mirror assembly and viewing oncoming headlights of approaching vehicles through the front windshield of the vehicle) and the VPM can control the intensity and/or direction of the light beam output from the HID headlamps as a function of the light level of the oncoming approaching headlamps as detected by the interior rearview mirror located forward-facing multipixel CMOS camera-on-a-chip light detector. Preferably, the intensity of the light beam output by the vehicle's HID lamps is inversely proportional to the intensity of the detected oncoming headlamps and, most preferably, the intensity of the HID headlamps is continuously variable inversely proportional to the intensity of the oncoming headlight intensity of approaching vehicles as detected by the forward-facing CMOS camera.

Further, and preferably, the vehicle may be equipped with a mobile cellular phone that is docked into a cell phone cradle system (such as in the CellPort 3000 system available from Cellport Systems Inc. of Boulder, Colo.) to allow a driver to conduct a hands-free telephone call when driving, and to provide the driver the option of undocking the cellular phone as desired in order to use the cellular phone, for example, when the driver departs the vehicle. The cell phone cradle system can include a sound-processing system (preferably including a microphone or microphone array, and such as is disclosed in commonly assigned patent application Ser. No. 09/466,010, filed Dec. 17, 1999, by DeLine et al. for an INTERIOR REARVIEW MIRROR SOUND PROCESSING SYSTEM, now U.S. Pat. No. 6,420,975, the disclosure of which is hereby incorporated herein by reference, and other accessories, and with the cell cradle providing outputs at least partially processed by the VPM.

The vehicle may also be equipped with a navigational system, such as a global positioning system, and with controls and/or functions of said navigational system being at least partially processed by VPM 14. For a vehicle equipped with a GPS system and with a cell phone cradle (such as the CellPort 3000 system), a control input can be provided in the interior of the vehicle (such as at or on the interior mirror assembly) and/or a voice command control system can be provided whereby when the control input and/or voice command is actuated, a call is initiated to an external service (such as an emergency service of a concierge service or an information service) located remote from the vehicle and wherein the location of the vehicle (as generated by the vehicular navigational system) is automatically transmitted to the external service so that the external service can know the location of the vehicle and so provide assistance, advice and/or directions, and the like, to the driver of that vehicle. Such communication of geographic positional data can be transmitted by telecommunication via a phone network (such as Sprint or MCI or ATT, or the like) in a voice-over-data format allowing the driver to have a conversation with the service provider (and/or with another party) concurrent with the transmission of the vehicle location information to the service provider via telephonic linkage via the docked cell phone (or, optionally, via a BLUETOOTH or similar short-range RF wireless link between a cellular phone in, for example, the pocket of a driver and a cell phone linking/telecommunication/telematic station located, for example, at an interior rearview mirror assembly of the vehicle or in a dashboard or console area of the vehicle) to the external service provider. Preferably, at least some of such processing is handled by VPM 14 and, in particular, when videoconferencing is used.

The present invention can be used in a lane change aid system such as disclosed in a commonly assigned provisional patent application Ser. No. 60/309,022 filed Jul. 31, 2001, by Schofield for a REARWARD LANE DETERMINATION FOR AN AUTOMOTIVE LANE CHANGE AID and a utility patent application filed concurrently herewith by Schofield for an AUTOMOTIVE LANE CHANGE AID, now U.S. Pat. No. 6,882,287, the disclosures of which are hereby incorporated herein by reference.

Also, a night vision system camera (such as an infrared detecting microbolometer night vision camera or a CMOS/near-IR detecting camera used in conjunction with a near-IR laser source for illumination forward of the vehicle) and an intelligent headlamp controller (such as a forward-facing CMOS video camera that automatically detects approaching vehicles and that dims the headlights of the host vehicle in response) can have their outputs combined/fused in accordance with the present invention to identify objects hazardous to the driver, such as a deer crossing the road ahead of the vehicle as the vehicle travels down a dark road at night. The control can, in response, automatically activate one or both existing headlamps, for example, to flash them or to move from a low-beam state to a high-beam state or to activate an additional headlamp or fog lamp or to adjust headlamps to high beam so that the object may be illuminated for the driver. Current night vision systems may either provide too much information for the driver to usefully assimilate or may distract him/her from attention to the road. The above combination achieved via the fusion system of the present invention allows use of the night vision system/intelligent headlamp controller to automatically provide extra forward illumination at the time required for the driver to take action to avoid a problem, which is the real intent behind the night vision system in the first place. The fusion of these inputs into a single processor achieves optimized nighttime driving safety. Note that a single forward-facing camera can perform both the night vision and intelligent headlamp control functions.

VPM 14 may receive both wired inputs and wireless inputs. For example, a restricted-range RF wireless communication device such as a BLUETOOTH device (housed, for example within an inside mirror or housed elsewhere in the interior cabin such as in an overhead console or a facia/instrumentation panel) can be used as a convenient channel location for the programming or reprogramming of various types of radio-frequency (RF) devices in a vehicle and/or to facilitate the use of RF as a means to program or reprogram non-RF devices to provide drivers with a more complete personalization of a vehicle (e.g., trainable garage door open, memory seat/mirror position, outside mirror position, etc.). This can be used in, for example, rental cars where an RF signal can be provided (such as via an RF transmitter located in the interior mirror assembly or in a windshield electronic accessory module) from a personal display assistant device (PDA) such as a PalmPilot® PDA and thus provide a driver with immediate personalization to include temperature/climate control, radio setting, exterior mirror reflector position and other preferences.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A video processor module suitable for use in a vehicle, said video processor module comprising:
   a video processor;
   a plurality of imaging sensor interfaces, said plurality of imaging sensor interfaces comprising at least (a) a first imaging sensor interface configured for communication with a first imaging sensor of a vehicle equipped with said video processor module and (b) a second imaging sensor interface configured for communication with a second imaging sensor of the equipped vehicle, and wherein said first and second imaging sensor interfaces receive image data captured by the first and second imaging sensors of the equipped vehicle, respectively;
   wherein said first imaging sensor interface is configured for communication with one of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle, and wherein said second imaging sensor interface is configured for communication with another of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle;
   wherein said video processor comprises an object detection section;
   wherein said video processor comprises a camera selection section;
   wherein said video processor comprises a camera control section;
   wherein said video processor module comprises a vehicle interface section;
   wherein said video processor comprises a memory section;

wherein said camera control section integrates data by fusing data received by said first and second imaging sensor interfaces from the first and second imaging sensors of the equipped vehicle, respectively, and data received by at least one non-imaging sensor interface of said video processor module from at least one non-imaging sensor of the equipped vehicle; and wherein said camera control section integrates said data by fusing said data into a single database in a standard format.

2. The video processor module of claim 1, further comprising at least one non-imaging sensor interface configured for communication with at least one non-imaging sensor of the equipped vehicle.

3. The video processor module of claim 2, wherein said video processor comprises a core that is operable to exchange data with said at least one non-imaging sensor interface via a communication bus of the equipped vehicle.

4. The video processor module of claim 3, wherein said core is operable to exchange said data via at least one of a CAN bus of the equipped vehicle and a LIN bus of the equipped vehicle.

5. A video processor module suitable for use in a vehicle, said video processor module comprising:
a video processor;
a plurality of imaging sensor interfaces, said plurality of imaging sensor interfaces comprising at least (a) a first imaging sensor interface configured for communication with a first imaging sensor of a vehicle equipped with said video processor module and (b) a second imaging sensor interface configured for communication with a second imaging sensor of the equipped vehicle, and wherein said first and second imaging sensor interfaces receive image data captured by the first and second imaging sensors of the equipped vehicle, respectively;
wherein said first imaging sensor interface is configured for communication with one of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle, and wherein said second imaging sensor interface is configured for communication with another of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle;
wherein said video processor comprises an object detection section;
wherein said video processor comprises a camera selection section;
wherein said video processor comprises a camera control section;
wherein said video processor module comprises a vehicle interface section;
wherein said video processor comprises a memory section;
at least one non-imaging sensor interface configured for communication with at least one non-imaging sensor of the equipped vehicle; and
wherein said video processor is operable to fuse data from at least two of (a) said first imaging sensor interface, (b) said second imaging sensor interface and (c) said at least one non-imaging sensor interface, and wherein said video processor is operable to fuse said data into a single database in a standard format, and wherein said video processor provides at least one output signal in response to processing said fused data of said single database, said at least one output signal comprising at least an output signal for conveying information to the driver of the equipped vehicle that is used by the driver of the equipped vehicle when the driver is normally operating the equipped vehicle.

6. The video processor module of claim 5, wherein said video processor comprises a video processor chip comprising at least one of (a) said object detection section, (b) said camera selection section and (c) said camera control section.

7. The video processor module of claim 5, wherein said object detection section is operable to detect objects in captured image data received by at least one of said first and second imaging sensor interfaces from the first and second imaging sensors, respectively.

8. The video processor module of claim 5, wherein said vehicle interface section interfaces with a communication bus of the equipped vehicle.

9. The video processor module of claim 8, wherein said vehicle interface section interfaces with at least one of a CAN bus of the equipped vehicle and a LIN bus of the equipped vehicle.

10. The video processor module of claim 5, wherein said object detection section comprises tracking of at least one object in captured images received by at least one of said first and second imaging sensor interfaces from the first and second imaging sensors, respectively.

11. The video processor module of claim 5, wherein said object detection section comprises classification of at least one object in at least one captured image received by at least one of said first and second imaging sensor interfaces from the first and second imaging sensors, respectively.

12. The video processor module of claim 11, wherein an object imaged by at least one of the first and second imaging sensors of the equipped vehicle is at least partially identified by said object classification via processing of said image data received by at least one of said first and second imaging sensor interfaces.

13. The video processor module of claim 12, wherein said object detection section classifies said at least partially identified object.

14. The video processor module of claim 13, wherein said object detection section comprises object tracking for tracking an identified object and wherein said object detection section classifies a tracked object.

15. The video processor module of claim 5, wherein said camera control section is operable to control, via at least one of said first and second imaging sensor interfaces, at least one of the first and second imaging sensors of the equipped vehicle.

16. The video processor module of claim 15, wherein said camera control section is operable to integrate image data received by said first and second imaging sensor interfaces from the first and second imaging sensors of the equipped vehicle, respectively.

17. The video processor module of claim 5, wherein said camera control section integrates data by fusing data received by said first and second imaging sensor interfaces from the first and second imaging sensors of the equipped vehicle, respectively, and data received by at least one non-imaging sensor interface of said video processor module from at least one non-imaging sensor of the equipped vehicle.

18. The video processor module of claim 5, wherein said video processor comprises a diagnostic section for performing diagnostics.

19. The video processor module of claim 5, wherein said video processor comprises a display section.

20. The video processor module of claim 19, wherein said display section is operable to generate data communicated through said vehicle interface section for use by a video display screen of the equipped vehicle.

21. The video processor module of claim 20, wherein said video processor is operable to merge image data received by said first and second imaging sensor interfaces from the first and second imaging sensors of the equipped vehicle, respectively, to generate for display on the video display screen of the equipped vehicle a video image for viewing by the driver of the equipped vehicle that exceeds the field of view of a single one of the first and second imaging sensors of the equipped vehicle.

22. The video processor module of claim 21, wherein said video processor is operable to merge image data received by said first and second imaging sensor interfaces from the first and second imaging sensors of the equipped vehicle, respectively, to generate for display on the video display screen of the equipped vehicle a panoramic video image for viewing by the driver of the equipped vehicle.

23. The video processor module of claim 20, wherein said video processor comprises a graphics section that generates graphics communicated through said vehicle interface section for displaying on the video display screen of the equipped vehicle for viewing and use by a driver of the equipped vehicle when the driver is normally operating the equipped vehicle.

24. The video processor module of claim 23, wherein said graphics section of said video processor is operable to generate a graphical overlay communicated through said vehicle interface section for display by the video display screen of the equipped vehicle.

25. The video processor module of claim 5, wherein said video processor is operable to electronically reduce image distortion in images captured by the first imaging sensor of the equipped vehicle by processing captured image data received by said first imaging sensor interface.

26. The video processor module of claim 5, wherein said video processor is operable to enhance data received by said first and second imaging sensor interfaces from the first and second imaging sensors of the equipped vehicle, respectively.

27. The video processor module of claim 5, further comprising image stabilization operable to process image data received by said first and second imaging sensor interfaces from the first and second imaging sensors of the equipped vehicle, respectively.

28. The video processor module of claim 5, wherein said video processor comprises a core that is operable to exchange data with said first and second imaging sensor interfaces.

29. The video processor module of claim 5, wherein said first imaging sensor interface is configured for communication with a forward-facing imaging sensor mounted at an interior mirror assembly of the equipped vehicle, and wherein at least one of (a) the forward-facing imaging sensor provides, at least in part, a headlamp control function, and (b) the forward-facing imaging sensor provides, at least in part, a windshield wiper control function.

30. The video processor module of claim 5, wherein said first and second imaging sensor interfaces comprise at least one of a firewire transceiver and an NTSC transceiver.

31. The video processor module of claim 5, wherein said first and second imaging sensor interfaces include at least one wireless interface operable to communicate with at least one of (a) a restricted-range radio-frequency communication device housed at an interior mirror of the equipped vehicle, (b) a restricted-range radio-frequency communication device housed at an overhead console of the equipped vehicle, (c) a restricted-range radio-frequency communication device housed at an instrument panel of the equipped vehicle, (d) a restricted-range radio-frequency communication device operable to program radio-frequency devices within the equipped vehicle, (e) a restricted-range radio-frequency communication device operable to receive user selection of vehicle parameters including vehicle parameters chosen from a garage door opener code, memory seat position, memory mirror position and exterior minor position, and (f) a restricted-range radio-frequency communication device comprising a personal display assistant device.

32. The video processor module of claim 5, wherein said video processor provides at least one of (a) detection of other vehicles exterior the equipped vehicle, (b) detection of a lane on a road at or near the equipped vehicle, (c) an adaptive speed control of the equipped vehicle, (d) a reverse aid warning to the driver of the equipped vehicle during a reversing maneuver of the equipped vehicle, (e) ambient light sensing, (f) detection of other vehicles at or near or approaching the equipped vehicle, (g) control of a state of a headlamp of the equipped vehicle, (h) detection of at least one chosen from presence, position and size of a person.

33. The video processor module of claim 32, wherein said video processor provides detection of at least one chosen from presence, position and size of an occupant inside a cabin of the equipped vehicle.

34. A video processor module suitable for use in a vehicle, said video processor module comprising:
   a video processor;
   a plurality of imaging sensor interfaces, said plurality of imaging sensor interfaces comprising at least (a) a first imaging sensor interface configured for communication with a first imaging sensor of a vehicle equipped with said video processor module and (b) a second imaging sensor interface configured for communication with a second imaging sensor of the equipped vehicle, and wherein said first and second imaging sensor interfaces receive image data captured by the first and second imaging sensors of the equipped vehicle, respectively;
   wherein said first imaging sensor interface is configured for communication with one of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle, and wherein said second imaging sensor interface is configured for communication with another of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle;
   at least one non-imaging sensor interface configured for communication with at least one non-imaging sensor of the equipped vehicle;
   wherein said video processor comprises an object detection section;
   wherein said video processor comprises a camera selection section;

wherein said video processor comprises a camera control section;

wherein said video processor module comprises a vehicle interface section;

wherein said video processor comprises a memory section;

wherein said video processor provides at least one of (a) detection of other vehicles exterior the equipped vehicle, (b) detection of a lane on a road at or near the equipped vehicle, (c) an adaptive speed control of the equipped vehicle, (d) a reverse aid warning to the driver of the equipped vehicle during a reversing maneuver of the equipped vehicle, (e) ambient light sensing, (f) detection of other vehicles at or near or approaching the equipped vehicle, (g) control of a state of a headlamp of the equipped vehicle, (h) detection of at least one chosen from presence, position and size of a person; and wherein said video processor is operable to fuse data from at least two of (a) said first imaging sensor interface, (b) said second imaging sensor interface and (c) said at least one non-imaging sensor interface, and wherein said video processor is operable to fuse said data into a single database in a standard format, and wherein said video processor provides at least one output signal in response to processing said fused data of said single database, said at least one output signal comprising at least an output signal for conveying information to the driver of the equipped vehicle that is used by the driver of the equipped vehicle when the driver is normally operating the equipped vehicle.

35. The video processor module of claim 34, wherein said video processor provides detection of at least one chosen from presence, position and size of an occupant inside a cabin of the equipped vehicle.

36. A video processor module suitable for use in a vehicle, said video processor module comprising:

a video processor;

a plurality of imaging sensor interfaces, said plurality of imaging sensor interfaces comprising at least (a) a first imaging sensor interface configured for communication with a first imaging sensor of a vehicle equipped with said video processor module and (b) a second imaging sensor interface configured for communication with a second imaging sensor of the equipped vehicle, and wherein said first and second imaging sensor interfaces receive image data captured by the first and second imaging sensors of the equipped vehicle, respectively;

wherein said first imaging sensor interface is configured for communication with one of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle, and wherein said second imaging sensor interface is configured for communication with another of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle;

wherein said video processor comprises an object detection section;

wherein said video processor comprises a camera selection section;

wherein said video processor comprises a camera control section;

wherein said video processor module comprises a vehicle interface section;

wherein said video processor comprises a memory section;

wherein said video processor comprises a graphics section that generates graphics; and wherein said video processor is operable to electronically reduce image distortion in images captured by the first imaging sensor of the equipped vehicle by processing captured image data received by said first imaging sensor interface;

at least one non-imaging sensor interface configured for communication with at least one non-imaging sensor of the equipped vehicle; and wherein said video processor is operable to fuse data from at least two of (a) said first sensor interface, (b) said second imaging sensor interface and (c) said at least one non-imaging sensor interface, and wherein said video processor is operable to fuse said data into a single database in a standard format, and wherein said video processor provides at least one output signal in response to processing said fused data of said single database, said at least one output signal comprising at least an output signal for conveying information to the driver of the equipped vehicle that is used by the driver of the equipped vehicle when the driver is normally operating the equipped vehicle.

37. The video processor module of claim 36, wherein said graphics section generates graphics communicated through said vehicle interface section for displaying on the video display screen of the equipped vehicle for viewing and use by a driver of the equipped vehicle when the driver is normally operating the equipped vehicle.

38. The video processor module of claim 36, wherein said graphics section of said video processor is operable to generate a graphical overlay communicated through said vehicle interface section for display by the video display screen of the equipped vehicle.

39. A video processor module suitable for use in a vehicle, said video processor module comprising:

a video processor;

a plurality of imaging sensor interfaces, said plurality of imaging sensor interfaces comprising at least (a) a first imaging sensor interface configured for communication with a first imaging sensor of a vehicle equipped with said video processor module and (b) a second imaging sensor interface configured for communication with a second imaging sensor of the equipped vehicle, and wherein said first and second imaging sensor interfaces receive image data captured by the first and second imaging sensors of the equipped vehicle, respectively;

wherein said first imaging sensor interface is configured for communication with one of (a) a forward-facing imaging sensor of the equipped vehicle, (b) a rearward-facing imaging sensor of the equipped vehicle, (c) a left-side-facing imaging sensor of the equipped vehicle, (d) a right-side-facing imaging sensor of the equipped vehicle and (e) an inward-cabin-facing imaging sensor of the equipped vehicle, and wherein said second imaging sensor interface is configured for communication with another of (a) a forward-facing imaging sensor of the equipped vehicle, (b) a rearward-facing imaging sensor of the equipped vehicle, (c) a left-side-facing imaging sensor of the equipped vehicle, (d) a right-sidefacing imaging sensor of the equipped vehicle and (e) an inward-cabin-facing imaging sensor of the equipped vehicle;

wherein said vehicle interface section interfaces with a communication bus of the equipped vehicle;

wherein said video processor comprises an object detection section, and wherein said object detection section is operable to detect objects in captured image data received by at least one of said first and second imaging sensor interfaces from the first and second imaging sensors, respectively;

wherein said video processor comprises a camera selection section;

wherein said video processor comprises a camera control section;

wherein said video processor module comprises a vehicle interface section;

wherein said video processor comprises a memory section;

at least one non-imaging sensor interface configured for communication with at least one non-imaging sensor of the equipped vehicle; and wherein said video processor is operable to fuse data from at least two of (a) said first imaging sensor interface, (b) said second imaging sensor interface and (c) said at least one non-imaging sensor interface, and wherein said video processor is operable to fuse said data into a single database in a standard format, and wherein said video processor provides at least one output signal in response to processing said fused data of said single database, said at least one output signal comprising at least an output signal for conveying information to the driver of the equipped vehicle that is used by the driver of the equipped vehicle when the driver is normally operating the equipped vehicle.

40. The video processor module of claim 39, wherein said video processor comprises a video processor chip comprising at least one of (a) said object detection section, (b) said camera selection section and (c) said camera control section.

41. The video processor module of claim 39, wherein said object detection section comprises tracking of at least one object in captured images received by at least one of said first and second imaging sensor interfaces from the first and second imaging sensors, respectively.

* * * * *

UNITED STATES PATENT AND TRADEMARK OFFICE
CERTIFICATE OF CORRECTION

PATENT NO. : 8,405,725 B2
APPLICATION NO. : 12/708079
DATED : March 26, 2013
INVENTOR(S) : Martha A. McMahon and Troy O. Cooprider Page 1 of 1

It is certified that error appears in the above-identified patent and that said Letters Patent is hereby corrected as shown below:

In the Claims

Column 10:
Line 14, Claim 31, "minor" should be --mirror--

Column 12:
Line 7, Claim 36, Delete "and" after "graphics;"
Line 17, Claim 36, Insert --imaging-- after "first"

Signed and Sealed this
Eighteenth Day of February, 2014

Michelle K. Lee
*Deputy Director of the United States Patent and Trademark Office*